US006963488B1

(12) United States Patent
Chen

(10) Patent No.: US 6,963,488 B1
(45) Date of Patent: Nov. 8, 2005

(54) DEVICE TO CONVEY THE COOL AIR FROM AN AIR-CONDITIONER INTO A COMPUTER

(76) Inventor: Chin-Ping Chen, P.O. Box 697, Fongyuan City 420, Taichung County (TW)

( * ) Notice: Subject to any disclaimer, the term of this patent is extended or adjusted under 35 U.S.C. 154(b) by 0 days.

(21) Appl. No.: 10/992,662

(22) Filed: Nov. 22, 2004

(51) Int. Cl.$^7$ ............................................. H05K 7/20
(52) U.S. Cl. ........................ 361/687; 361/695; 361/696; 165/80.3; 165/185; 62/259.2; 454/184; 454/306
(58) Field of Search ................. 165/104.33, 104.14, 165/80.3; 361/687–703; 454/184, 306; 62/259.2

(56) References Cited

U.S. PATENT DOCUMENTS

| | | | |
|---|---|---|---|
| 2,912,624 A * | 11/1959 | Wagner ........................ 361/695 |
| 5,193,523 A * | 3/1993 | Denber ........................ 126/204 |
| 5,297,005 A * | 3/1994 | Gourdine ..................... 361/697 |
| 5,422,787 A * | 6/1995 | Gourdine ..................... 361/697 |
| 5,801,632 A * | 9/1998 | Opal ............................ 340/585 |
| 6,113,485 A * | 9/2000 | Marquis et al. ............. 454/184 |
| 6,117,005 A * | 9/2000 | Weiss .......................... 454/202 |
| 6,166,907 A * | 12/2000 | Chien .......................... 361/699 |
| 6,269,864 B1 * | 8/2001 | Kabadi ...................... 165/80.3 |
| 6,408,630 B2 * | 6/2002 | Macias et al. ............... 62/3.7 |
| 6,748,758 B2 * | 6/2004 | Imada et al. ............... 62/259.2 |
| 6,808,013 B2 * | 10/2004 | Lai et al. .................... 165/80.4 |
| 2003/0019234 A1 * | 1/2003 | Wayburn et al. ........... 62/259.2 |
| 2004/0000157 A1 * | 1/2004 | Imada et al. ............... 62/259.2 |
| 2004/0217072 A1 * | 11/2004 | Bash et al. ................... 211/26 |

* cited by examiner

*Primary Examiner*—Lynn Feild
*Assistant Examiner*—Zachary Pape

(57) ABSTRACT

A device to convey the cool air from an air-conditioner into a computer includes an air-conditioner having an air vent on right side including a plurality of louvers on upper portion, a partition on lower portion, at least a tubular adapter projected outward from the front surface thereof to define an air concentration passage thereinbetween and an exhaust fan secured to the inner surface of the partition, a hose having one end connected with the tubular adapter and the other end connected with an inlet of a radiator inside a computer for conveying the cool air into the radiator to cool off the CPU in the computer by which the CPU will be operated in a predetermined constant temperature.

3 Claims, 9 Drawing Sheets

(8-8)

DEVICE TO CONVEY THE COOL AIR FROM AN AIR-CONDITIONER INTO A COMPUTER

BACKGROUND OF THE INVENTION

The present invention relates to cool off appliances and more particularly to a device to convey cool air from an air-conditioner to a computer to cool off the CPU in the computer in order to intensify the radiative function of a radiator in the computer.

As we know that the temperature in a computer will become higher and higher after a period of operation in which the CPU is severely affected by high temperature. So that to keep the CPU of the computer to operate normally and smoothly the radiation of the heat in the computer is of a very important factor. FIG. 1 shows a prior art computer 1 having a main board 5 in a cabinet including a CPU 2, a radiator 3 and an air fan 4 on the CPU 2 for cooling off the high temperature. The radiator has a lot of metallic fins spacedly formed to facilitate the air fan 4 to blow the main board 5 for cooling off the CPU 2 which will be kept in constant temperature. However, this radiation method is not so ideal because the temperature in the CPU 2 is always higher than the indoor temperature. If utilizes an air-conditioner to lower the indoor temperature and to indirectly lower the temperature in the CPU 2, it should consume a great deal of the electricity. Besides, if the indoor temperature is too low, the operator shall feel uncomfortable. So that this method could not solve the real problem.

A water-cooled type of air conditioning always has better radiation effect. But the water permeability is of an important factor that has to be considered. FIG. 2 shows another type of prior art which utilizes a pump 11 that supplies the cold water 12 into the radiator 13 to form a cooling circulation to cool off in the main board 14 and the CPU 15 of the main machine 10. Due to the high cost and that the water could not permeate out. Thus, few operator of the computer adopts this type.

SUMMARY OF THE PRESENT INVENTION

The present invention has a main object to provide a device to convey the cool air from an air-conditioner into a computer which can be greatly increase the radiation effect in an electronic equipment, decrease the consumption of the power source in addition to keep the ambience circumference in appropriate temperature.

Accordingly, the device to convey the cool air from an air-conditioner into a computer comprises a partition disposes at the lower portion of an air outlet. The partition has at least an air bunch, an air exhaust fan on the back of the partition, a guiding pipe communicates the air bunch with an air vent of a computer to convey the cool air into the radiator in the main body of the computer. The radiator has an inlet, an outlet and a plurality of radiation pins.

The present invention will become more fully understood by reference to the following detailed description thereof when read in conjunction with the attached drawings.

DETAILED DESCRIPTION OF THE PREFERRED EMBODIMENT

Figure 1:
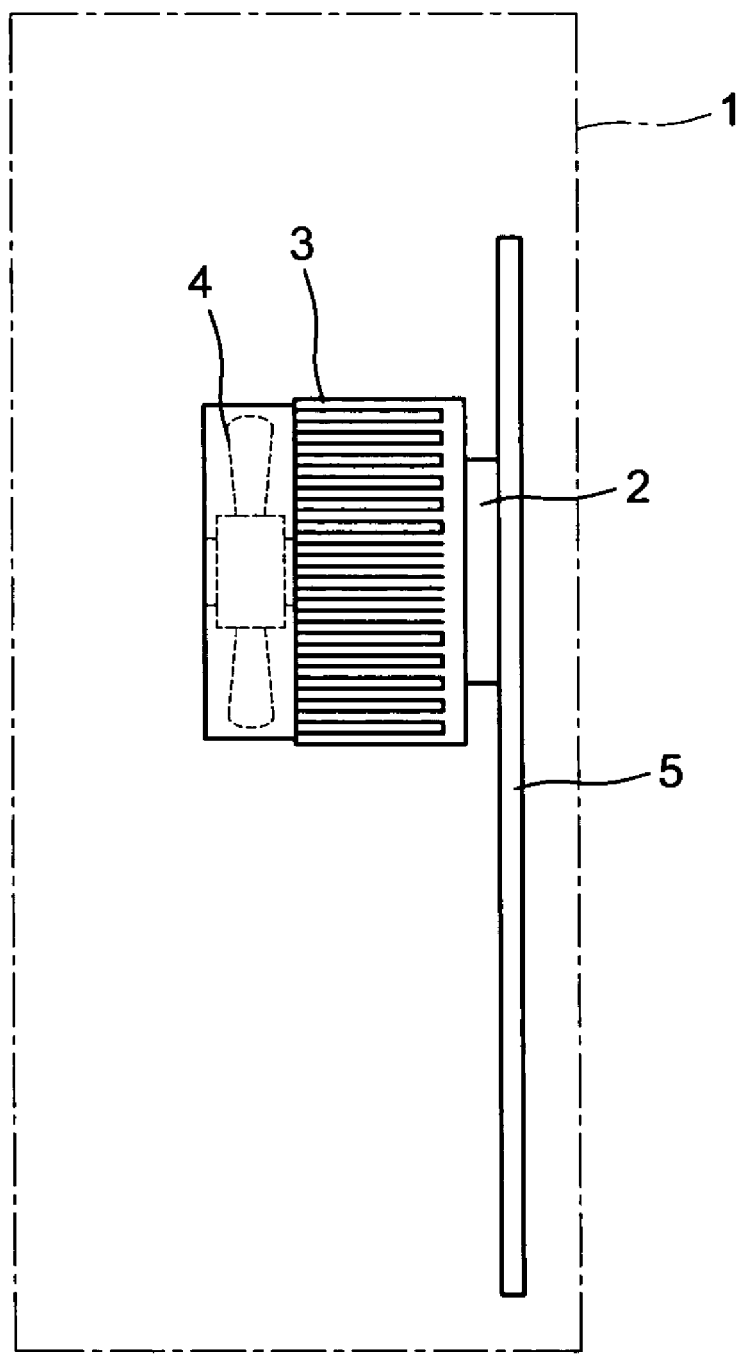
FIGS. 1 and 2 are the plane views of two type of the computer radiation intensifying device according to the prior arts.
Figure 2:
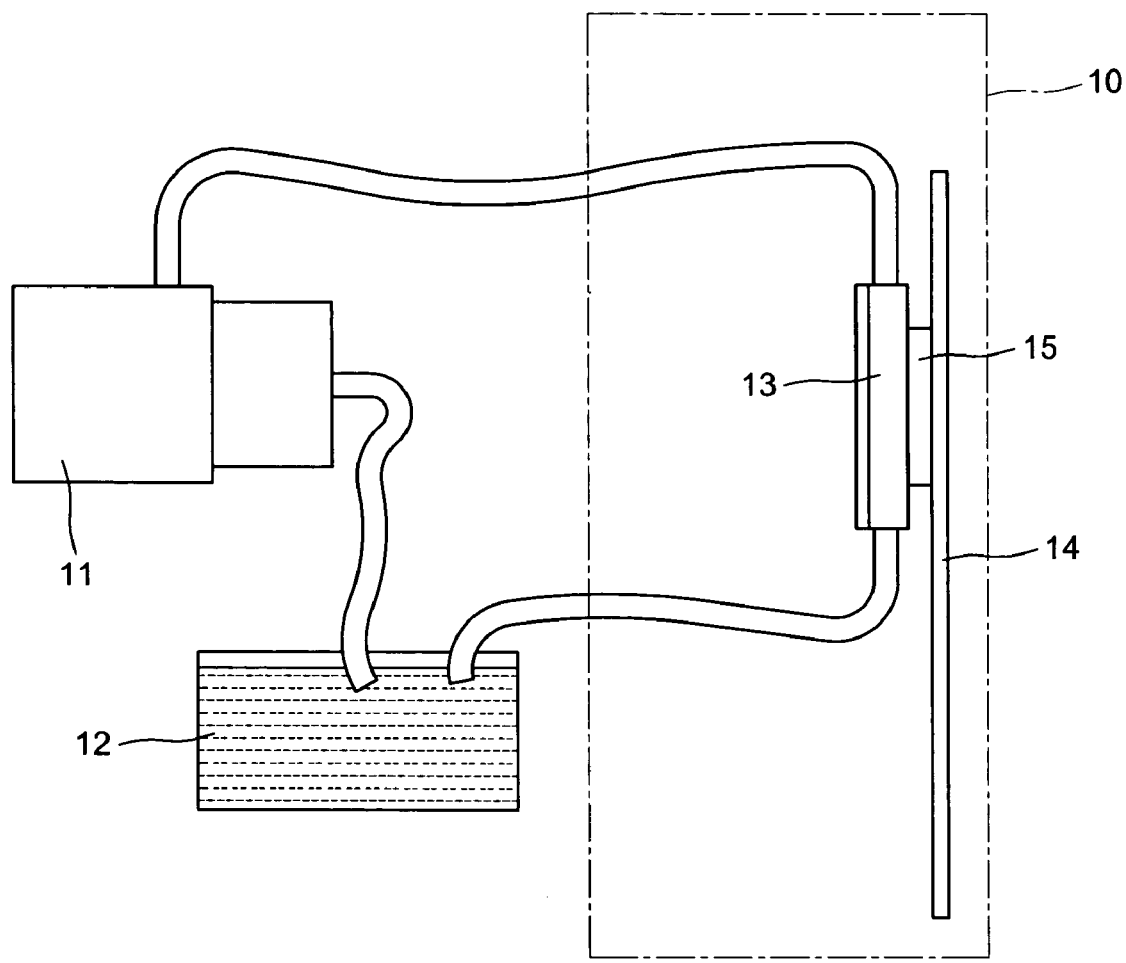
Figure 3:
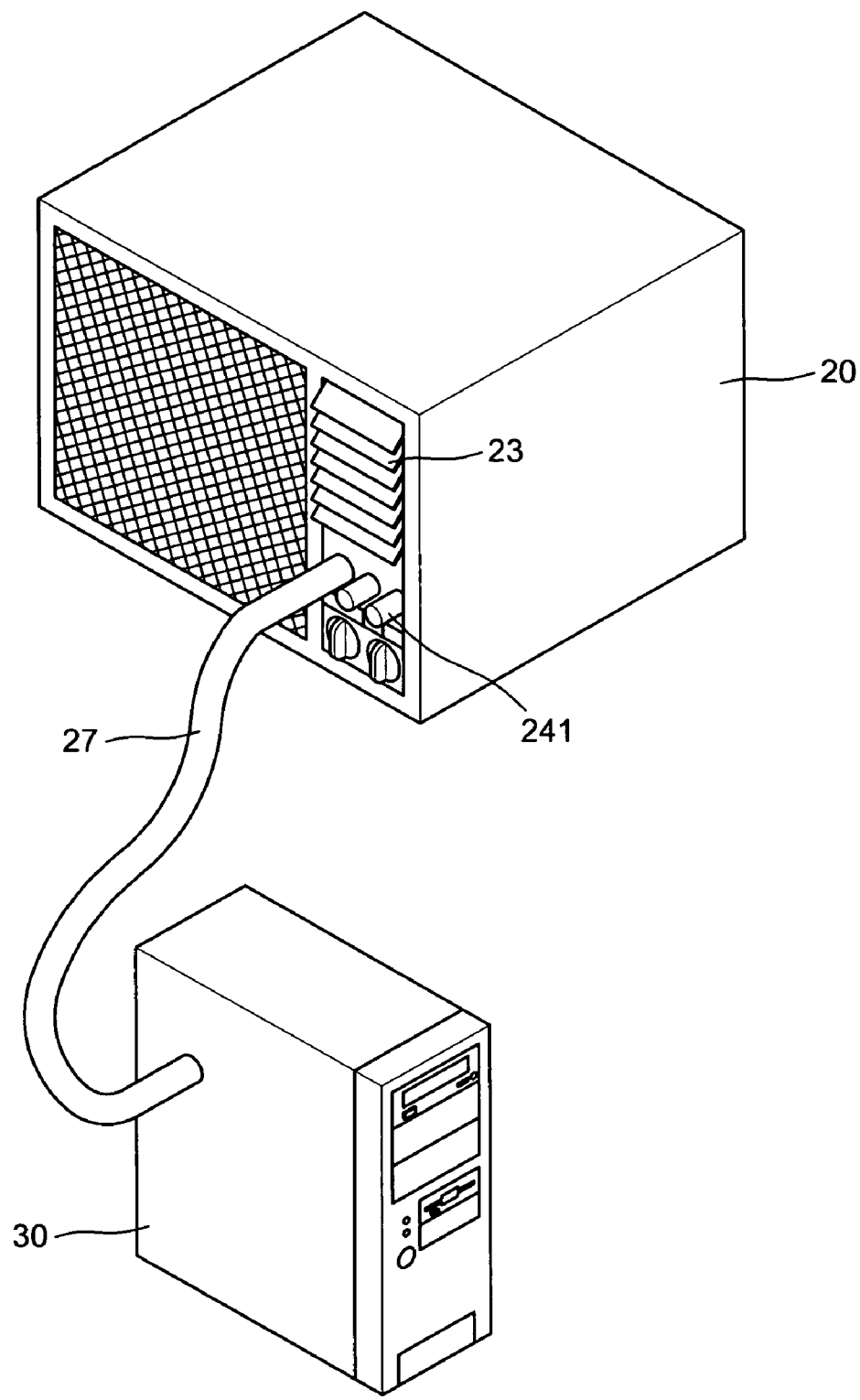
FIG. 3 is a perspective view to show the preferred embodiment of a computer utilizing the cool air from an air-conditioner to cool of the radiator according the present invention.
Figure 4:
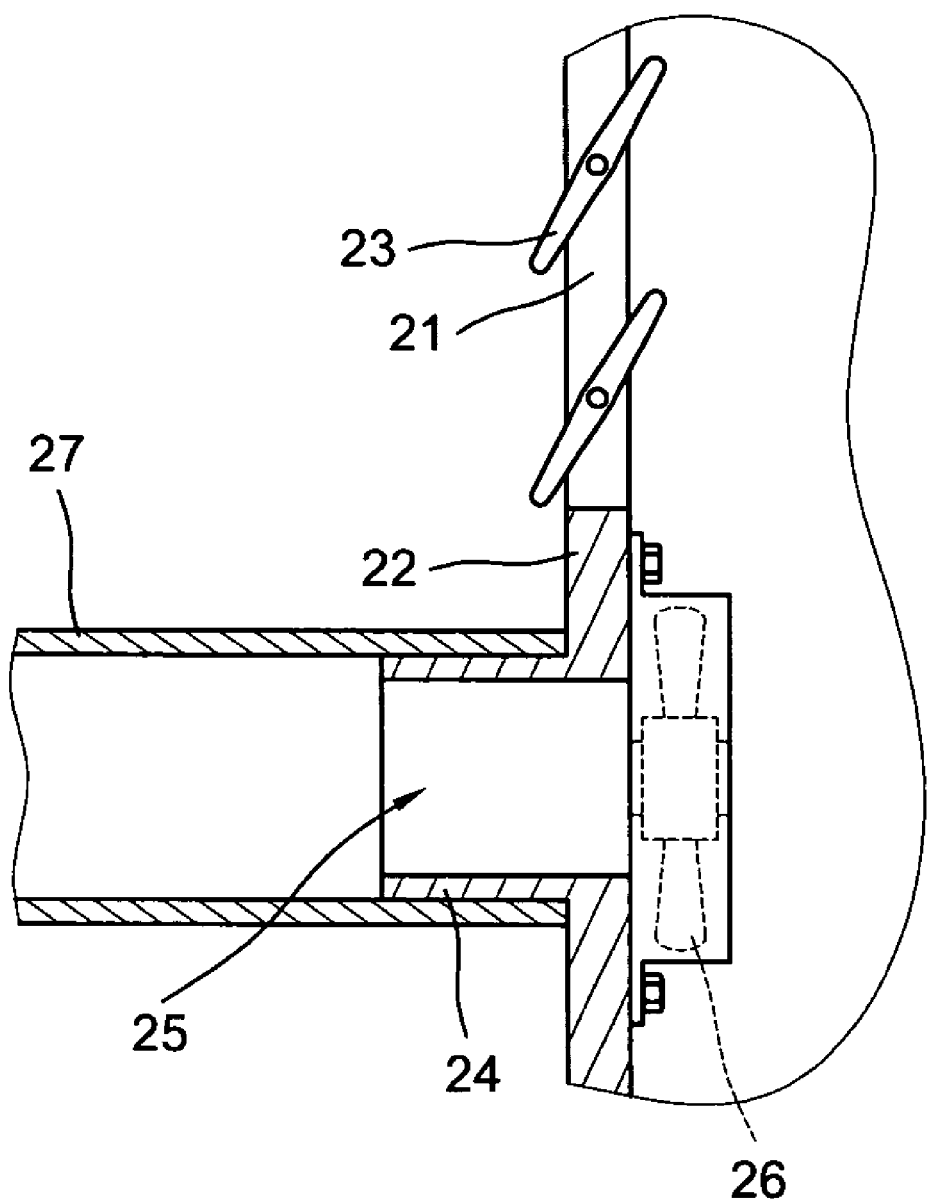
FIG. 4 is a sectional view to partially show the assembly of the elements of the present invention.
Figure 5:
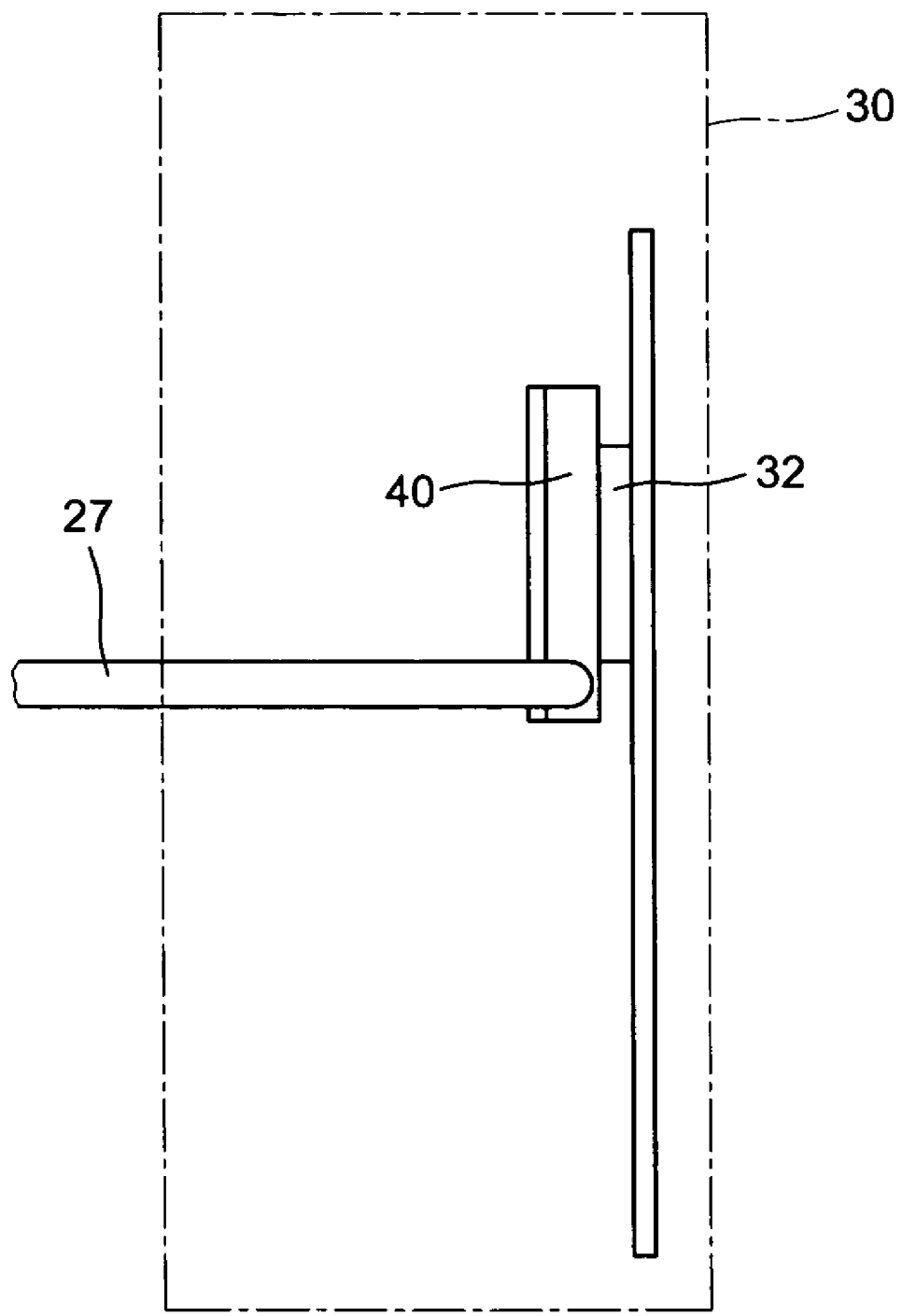
FIG. 5 is a plane view to show the device of the present invention utilized in a computer.
Figure 6:
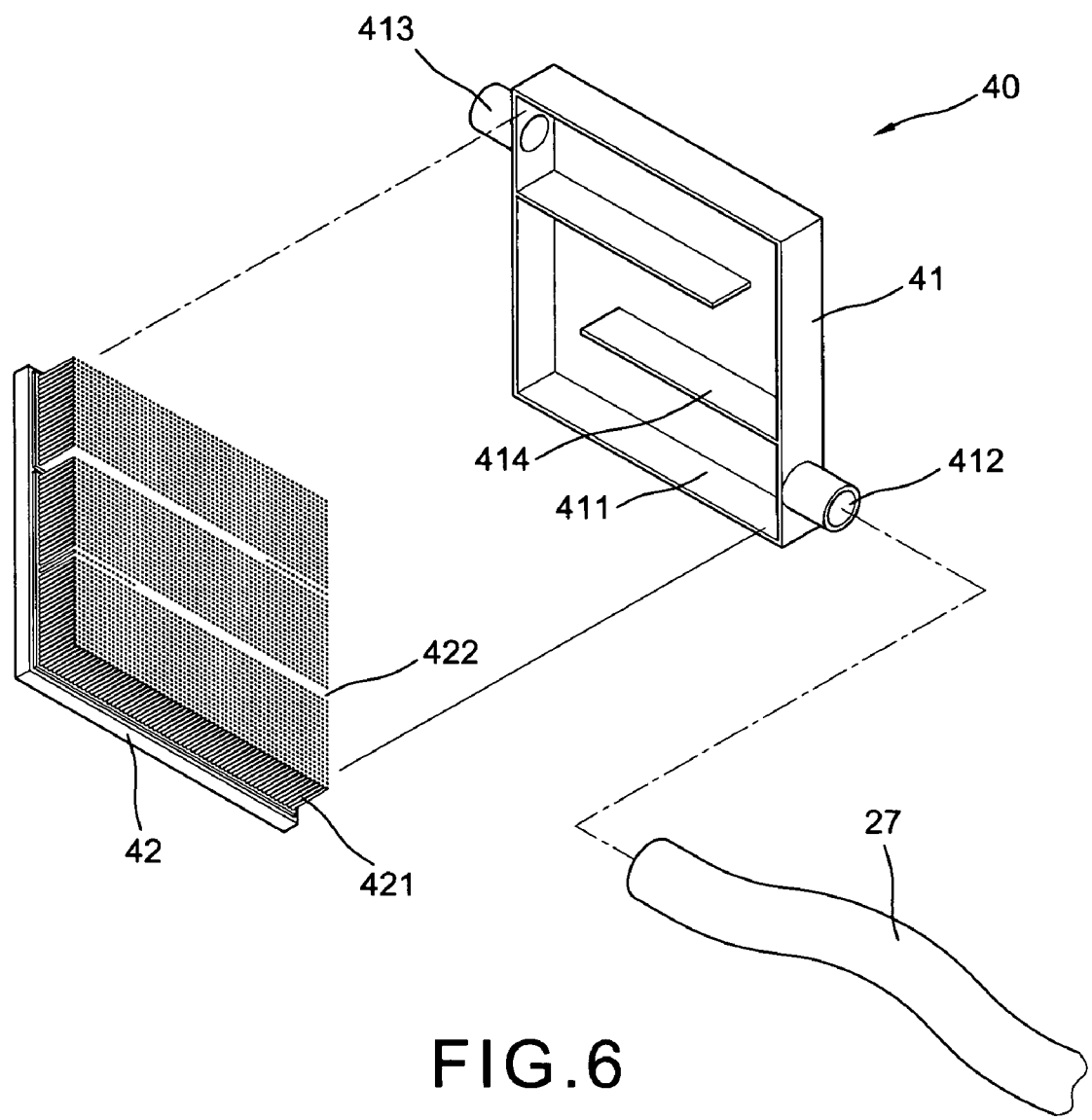
FIG. 6 is an exploded perspective view of the radiator in the computer.
Figure 7:
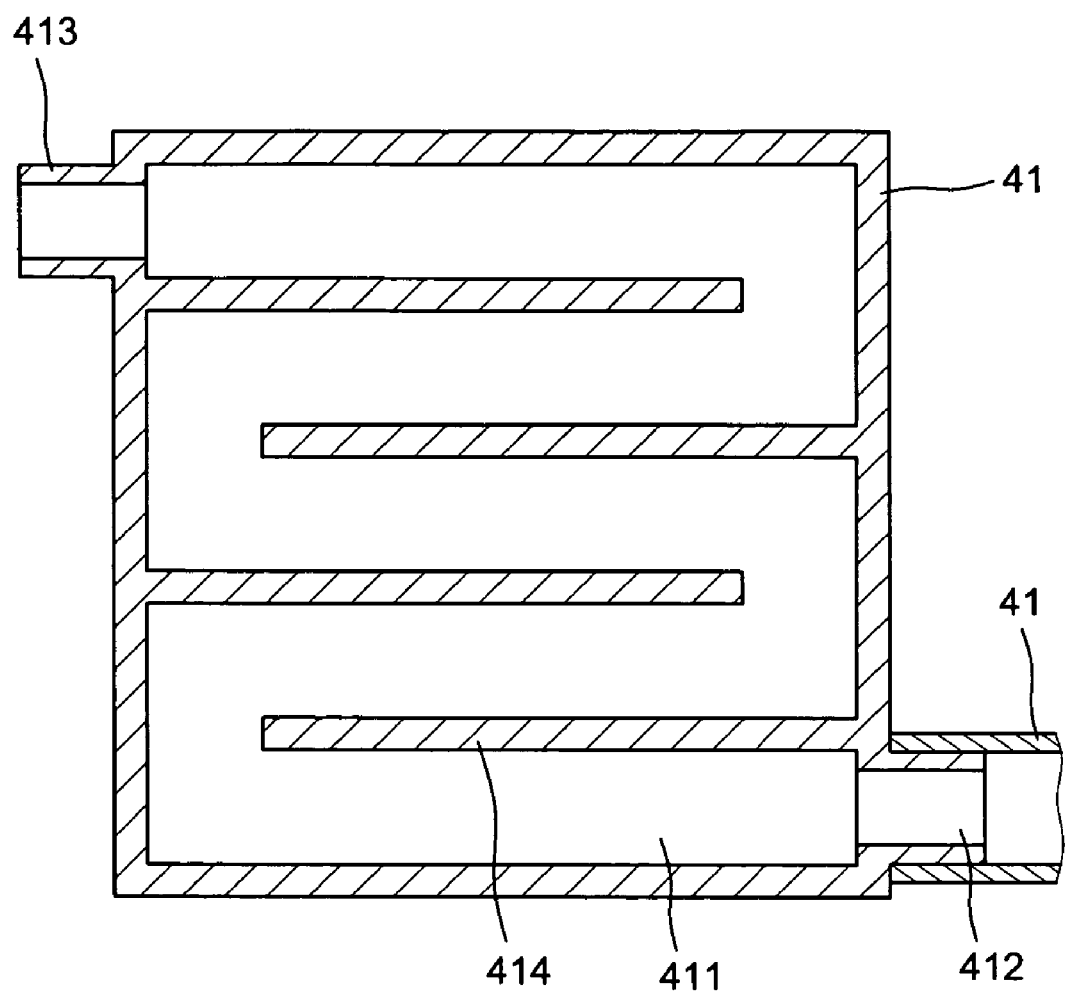
FIG. 7 is a sectional view to show a framed cover of the radiator.
Figure 8:
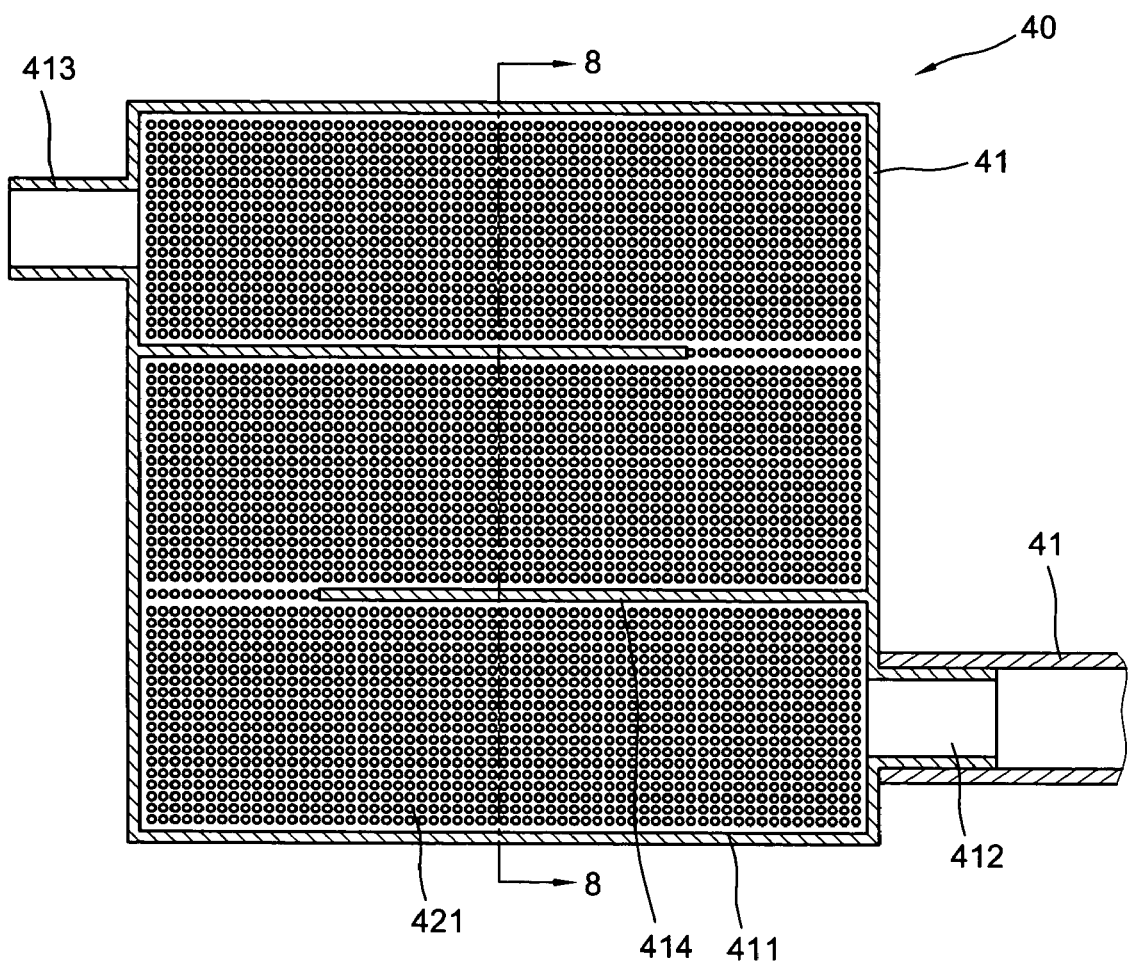
FIG. 8 is a sectional view to show that the framed cover is engaged with the radiator.
Figure 9:
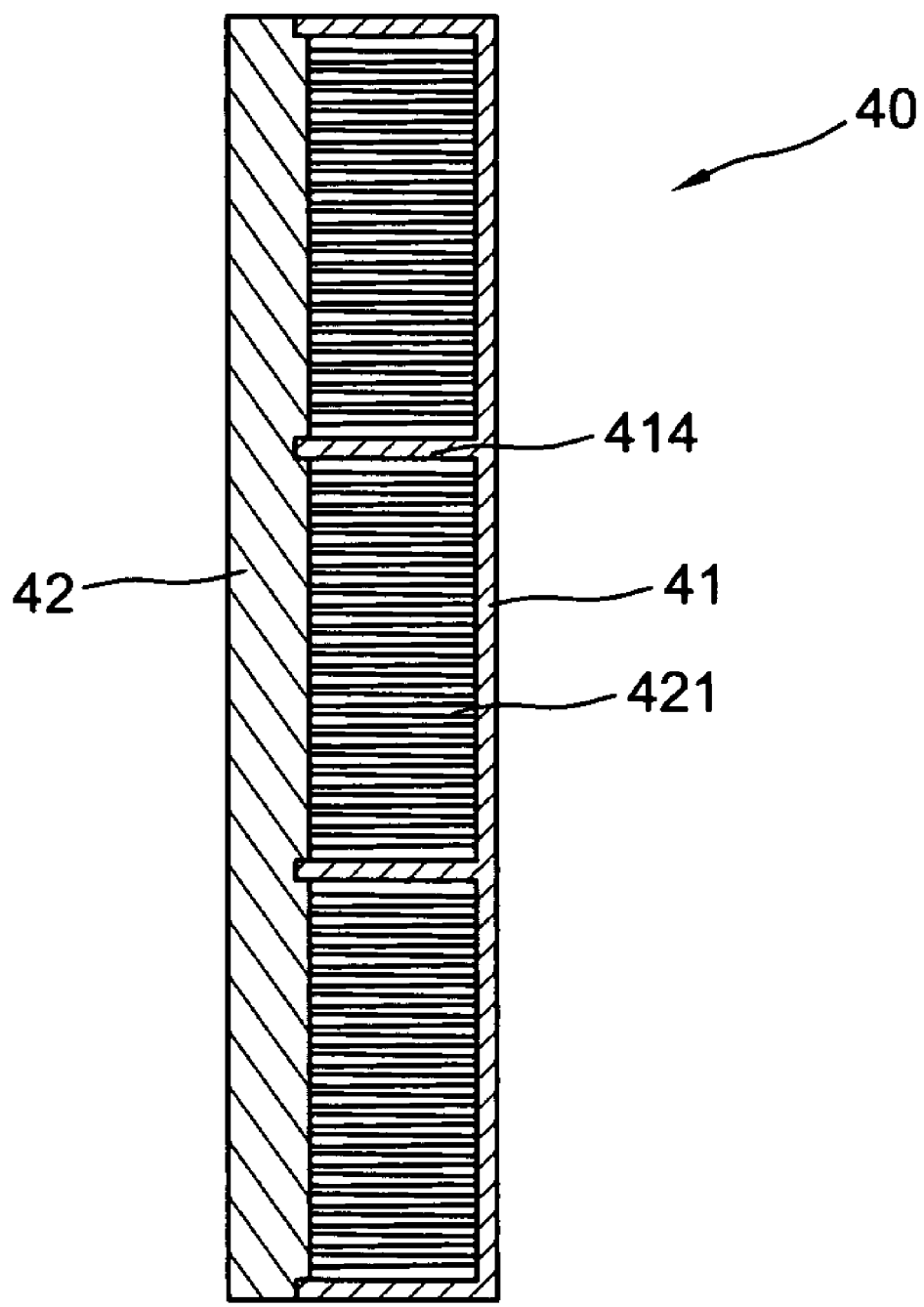
FIG. 9 is a sectional view taken along line 8—8 of FIG. 8.

With reference to the drawings and initiated from FIGS. 3 and 4, the device to convey the cool air from an air-conditioner into a computer of the present invention comprise an air- conditioner 20 having an air vent 21 on the right side of which disposes a partition 22 on lower portion. The partition 22 may be a foldable type and/or a solid type, a plurality of louvers 23 dispose spaced apart in the air vent 21 above the partition 22. The louvers 23 are angularly adjustable to alter the exhausting directions for the cool air. The partition 22 has at least a tubular adapter 24 projected outward from the front surface thereof to define an air concentration passage 25 therein communicating to the inside of the cool air vent 21. An exhaust fan 26 secures to the inside of the partition 22 toward the air concentration passage 25. A hose 27 which is wrapped up around outer surface with heat insulation material has one end connected with the tubular adapter 24 and the other end connected with an inlet 412 of a framed cover 41 inside the computer 30.

Referring to FIGS. 6 to 10 of the drawings, the framed cover 41 belongs to a radiator 40 which is composed of the cover 41 and a rectangular base 42. The cover 41 has an inlet 412, an outlet 413 and a pair of alternately arranged plates 414 to defined a detour air passage 411 therinbetween. The rectangular base 42 has a plurality of regularly aligned slender radiation pins 421 on one side and a pair of receiving spaces 422 engaged with the plates 414 of the framed cover 41. The cool air from the air-conditioner 20 continuously enters into the detour air passage 411 and the slender radiation pins 421 and exhausts out of the outlet 413 to keep the radiator 40 in a predetermined constant temperature. Therefore the utilizing the cool air from an air-conditioner 20 to cool up the radiator 40 in a computer 30 is achieved.

In operation, simultaneously turn on the air-conditioner 20, the computer 30 and the exhaust fan 26 which draws out the cool air from the air-conditioner 20 and exhausts the cool air into the radiator 40 of the computer 30 through the hose 27. Meanwhile, a large part of the cool air exhausts out of the air vent 21 for cooling off the computer room to comfort the operator and to intensify the cooling effect for the radiator 40 in the computer 30. So as to enable the CPU 32 operated normally. In an alternate arrangement, if moves the exhaust fan 26 to the inside of inlet 412 or the outlet 413 of the radiator 40, it will present the same effect. Further, the utilizing the air-conditioner 20 to intensify the radiation effect in the computer 30 is one of an unprecedented source saving matter.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A device to convey the cool air from an air-conditioner into a computer comprising:
   an air-conditioner having an air vent on one side being separated into an upper portion and a lower portion, a plurality of angularly adjusted louvers regularly disposed on the upper portion, a partition secured to the lower portion including at least a tubular adapter projected outward from a front surface to define an air concentration passage therein communicating to inside of said air vent, and an exhaust fan secured to inner surface of said partition;
   a computer having a main board, a CPU on the main board and a radiator on the CPU for radiating heat from the CPU, said radiator comprising a rectangular base having a plurality of slender radiation pins regularly aligned on one side to defined a pair of alternately arranged receiving spaces thereinbetween, and a framed rectangular cover engaged with the outer sides of said slender radiation pins and a pair of alternately arranged plates formed spaced apart in the cover engaged with the receiving spaces of said base and defined a detour air passage thereinbetween, an inlet on right lower portion and an outlet on a left upper portion;
   a hose having one end connected with the tubular adapter of said air-conditioner and other end connected with the inlet of said radiator;
   whereby simultaneously turn on said air-conditioner, said computer and said exhaust fan to provide cool air through said hose to cool off the temperature for said radiator and said CPU and to simultaneously provide cool air to a computer room to comfort an operator.

2. The device as recited in claim 1, wherein said exhaust fan may move to the inside of the inlet and/or outlet of said radiator.

3. The device as recited in claim 1, wherein said hose is wrapped on outer surface with heat insulation material.

* * * * *